United States Patent
Goetz

(10) Patent No.: US 9,948,410 B2
(45) Date of Patent: Apr. 17, 2018

(54) MEASURING SYSTEM AND A MEASURING METHOD WITH BROADBAND SYNCHRONISATION AND NARROW-BAND SIGNAL ANALYSIS

(71) Applicant: Rohde & Schwarz GmbH & Co. KG, Munich (DE)

(72) Inventor: Matthias Goetz, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/895,424

(22) PCT Filed: May 13, 2014

(86) PCT No.: PCT/EP2014/059765
§ 371 (c)(1),
(2) Date: Dec. 2, 2015

(87) PCT Pub. No.: WO2015/113652
PCT Pub. Date: Aug. 6, 2015

(65) Prior Publication Data
US 2016/0329973 A1    Nov. 10, 2016

(30) Foreign Application Priority Data
Jan. 31, 2014   (DE) .................. 10 2014 201 755

(51) Int. Cl.
*H04J 1/16* (2006.01)
*H04B 17/15* (2015.01)
*H04B 17/17* (2015.01)

(52) U.S. Cl.
CPC ............. *H04B 17/15* (2015.01); *H04B 17/17* (2015.01)

(58) Field of Classification Search
CPC .................. H04B 17/15; H04B 17/17
(Continued)

(56) References Cited

U.S. PATENT DOCUMENTS 7,864,836 B1 * 1/2011 Zhidkov ............. H04L 25/0216
                                                      375/229
2007/0060976 A1   3/2007 Denzene et al.
(Continued)

FOREIGN PATENT DOCUMENTS

DE    102006057316 A1    6/2008
WO       0241013 A2      5/2002

OTHER PUBLICATIONS

Notification of Transmittal of Translation of the International Preliminary Report on Patentability (Chapter I or Chapter II) for International Application No. PCT/EP2014/059765, dated Aug. 11, 2016, 6 Page.

*Primary Examiner* — Mang Yeung
(74) *Attorney, Agent, or Firm* — Ditthavong & Steiner, P.C.

(57) ABSTRACT

A measuring system serves for measuring a broadband measurement signal. It contains a receiving unit for receiving the measurement signal and a processing unit for processing the measurement signal. The receiving unit is configured to receive the measurement signal with a broad bandwidth within a first measurement run. The processing unit is configured to recover information from the measurement signal received with a broad bandwidth. In turn, with the assistance of the information, the receiving unit is configured to receive at least one first frequency subdivision of the measurement signal with a narrow bandwidth within a second measurement run.

19 Claims, 3 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2008/0242232 | A1* | 10/2008 | Zavadsky | H04B 17/0087 455/67.11 |
| 2013/0265034 | A1 | 10/2013 | Salvi et al. | |
| 2014/0119316 | A1* | 5/2014 | Linden | H04L 5/0048 370/329 |

* cited by examiner

MEASURING SYSTEM AND A MEASURING METHOD WITH BROADBAND SYNCHRONISATION AND NARROW-BAND SIGNAL ANALYSIS

CROSS-REFERENCE TO RELATED APPLICATION

The present application is a national phase application of PCT Application No. PCT/EP2014/059765, filed May 13, 2014, which claims priority to German Patent Application No. 10 2014 201 755.6, filed on Jan. 31, 2014, the entire contents of which are herein incorporated by reference.

TECHNICAL FIELD

The invention, according to the various embodiments described herein, relates to a measuring system and a measuring method for measuring measurement signals.

BACKGROUND

In many innovative transmission methods in the field of communications technology, the trend in technology has been towards the development of ever broader transmission bandwidths and ever higher bandwidth efficiencies. As a result of the sustained and steady further development of electronic components, it has become possible to generate signals in modulators with broader bandwidth and higher quality, and at the same time, to receive with a corresponding quality in affordably manufactured receivers (set-top boxes, modems, mobile telephones). However, with the same level of technological development, the performance of the transmitter components is often in advance of the performance of the corresponding receiver components, for example, DACs versus ADCs. Furthermore, additional performance deficits occur in the receiver as a result of estimation errors in the synchronisation mechanisms. Nevertheless, this performance difference is not particularly restricting for transmitters and receivers participating in the actual communications infrastructure because the transmission channel generally degrades the signal and, accordingly, the receiver performance, for example, with regard to intrinsic MER (MER=modulation-error ratio) need not have the same value as in the transmitter.

By contrast, this difference is problematic for a measurement receiver with which the performance of the transmitter must be demonstrated directly at its output, because the intrinsic receiver MER should be as much as 6-10 dB higher than the value to be demonstrated, for example, in order to demonstrate a modulator MER.

As one example of this problem, the specification for DOCSIS 3.1 OFDM PHY will be used in the following. DOCSIS 3.1 is a bidirectional transmission standard for analog cable networks. In the downstream, OFDM channels are used with a bandwidth of up to 192 MHz and a sub-carrier spacing of 25 kHz or 50 kHz. At the same time, the desired maximal modulation order for each sub-carrier is 4096 QAM or respectively, in the medium-term-future, as much as 16384 QAM. To achieve these modulation orders, the specification for the downstream modulator requires an MER greater than 50 dB as an average of all sub-carriers within a 192 MHz channel.

A measurement receiver would therefore have to achieve an MER of at least 56 dB over the entire frequency range with a reception bandwidth of 192 MHz. This requirement would make the measurement receiver either extremely effort-intensive or even incapable of realisation. Using current technology, this MER performance could be realised with a reasonable effort, for example, with a reception bandwidth of 10 MHz. In general, however, the DOCSIS 3.1 specification does not provide for it to be able to synchronise with a receiver on only a part of the sub-carrier and therefore to implement a narrowband MER measurement.

For example, the German patent application DE 10 2006 057 316 A1 shows a measurement receiver for the reception of OFDM signals. However, the latter operates with a broad bandwidth in a single step and can therefore only achieve an accuracy of measurement which, with an identical technology level, is disposed below an accuracy of a transmitter to be measured.

SUMMARY

An object of the present invention is to provide a measuring system and a measuring method which allow a measurement of a broadband signal with very high measurement accuracy.

In accordance with the present disclosure, there is provided a measuring system for the measurement of a broadband measurement signal. It contains a receiver unit for receiving the measurement signal and a processing unit for processing the measurement signal. The receiving unit is configured to receive the measurement signal with a broad bandwidth in a first measurement run. The processing unit is configured to recover information from the measurement signal received with a broad bandwidth. The receiver unit is embodied, in turn, with the assistance of the information, to receive at least one first frequency subdivision of the measurement signal with a narrow bandwidth in a second measurement run. A narrowband reception of a frequency subdivision of the measurement signal is possible only with the assistance of the information recovered on the basis of the broadband reception, especially in the case of signals which contain information about a signal structure, especially a preamble. A significantly higher accuracy in the measurement of the measurement signal is achieved as a result of the narrowband reception.

Certain aspects include, the receiving unit configured to receive several, preferably all frequency subdivisions of the measurement signal in succession with a narrow bandwidth in the second measurement run. Accordingly, a high precision measurement of the entire measurement signal is possible at the cost of a slight increase in the measurement duration.

Other aspects include, the receiver unit including only one receiver. The reception-frequency range of the receiver in this context is adjustable. In this case, the receiver is configured to implement the first measurement run with a reception-frequency range adjusted with a broad bandwidth to the entire measurement signal, and then, to implement the second measurement run with a reception-frequency range adjusted with a narrow bandwidth to at least the first frequency subdivision of the measurement signal. In this manner, a high precision measurement of the measurement signal can be achieved at the same time, with only one receiver and with a very low effort on hardware.

As an alternative, the receiver unit includes a broadband receiver and at least one narrowband receiver. The broadband receiver is configured to implement the first measurement run, and the first narrowband receiver is then configured to implement at least one first part of the second measurement run. The first part of the second measurement run accordingly contains a reception of the first frequency subdivision. This means that the first measurement run and the second measurement run can take place in parallel. The information which is recovered in the first measurement run is used for the second measurement run, as soon as it is available. In particular, the results of the first measurement run can be used further in a post-processing of the results of the second measurement run in order to increase the accuracy of the measurement.

In the case of signals in which the information is absolutely necessary for a narrowband reception, the second measurement run is preferably started first, if the information is present.

Optionally, the information is constantly updated within the framework of an ongoing first measurement run and is available for an ongoing second measurement run.

In the case of signals in which the information is not absolutely necessary for the second measurement run, the first measurement run and the second measurement run are implemented at the same time.

In accordance with other aspects, the receiving unit includes a second narrowband receiver which is configured to implement at least one second part of the second measurement run. The second part of the measurement run accordingly includes a reception of at least one second frequency subdivision of the measurement signal. With simultaneous measurement of several frequency ranges of the measurement signal by the two narrowband receivers, a further increase in the rate of measurement can therefore be achieved.

In certain aspects, the receiver unit is configured to implement a synchronisation with the measurement signal as a part of the first measurement run and to implement an adjustment of a reception frequency and a reception sampling rate within the synchronisation. The processing unit is then configured to use the reception frequency and the reception sampling rate of the adjustment of the receiving unit as information for the information recovery. Accordingly, the narrowband reception can be implemented with already optimally adjusted reception frequency and reception sampling rate. In this manner, a further increase in measurement accuracy is achieved.

In accordance with other aspects, the processing unit is further configured to detect a signal structure of the measurement signal within the information recovery. The processing unit is then configured to determine a position of the first frequency subdivision within the measurement signal on the basis of the signal structure. In this manner, the second measurement run can be started in the optimal frequency range. This achieves an increase in the rate of measurement.

Alternatively or additionally, in this case, the processing unit and the receiving unit are preferably configured to determine and to compensate delay-time differences between the broadband reception and the narrowband reception on the basis of the signal structure. In this manner, a further increase in measurement accuracy can be realised.

In certain aspects, the processing unit is further configured to detect positions of continual pilots in the first frequency subdivision of the measurement signal within the information recovery. The processing unit and the receiving unit are then configured to detect positions of continual pilots in the first frequency subdivision of the measurement signal within the measurement run and to derive and to compensate phase differences of the broadband reception and of the narrowband reception from the positions of the continual pilots in the first frequency subdivision. A further increase in measurement accuracy is achieved by this compensation of the phase differences.

In accordance with other aspects, the processing unit is further configured to detect reception values of scattered pilots of the measurement signal within the information recovery and to implement a channel estimation on the basis of the reception values of the scattered pilots and, in this manner, to determine a frequency response of the broadband reception. In this case, the processing unit and the receiving unit are configured to detect reception values of scattered pilots in the first frequency subdivision of the measurement signal and to implement a channel estimation on the basis of the reception values of the scattered pilots, and in this manner, to determine a frequency response of the narrowband reception. A further increase in measurement accuracy can also be achieved through this measure.

The processing unit is further preferably configured to determine modulation orders of different subdivisions of the measurement signal within the information recovery, and, on the basis of the modulation orders, to determine one or more modulation orders of the first frequency subdivision. In this case, the receiving unit is configured to implement a decoding of symbols of the first frequency subdivision of the measurement signals received with a narrow bandwidth on the basis of the one or more modulation orders of the first frequency subdivision, and, on the basis of the decoded symbols of the first frequency subdivision, to determine a modulation-error ratio (MER) and/or a signal-noise ratio (SNR) and/or an error-vector magnitude (EVM) and/or further parameters of the measurement signal. In this manner, the measurement signal can also be measured rapidly and with high precision, even in the case of complex signal design with several different modulation orders and time-variant allocation of modulation orders to sub-carriers within the measurement signal.

A measuring method according to the invention serves for the measurement of a broadband measurement signal. In a first measurement run, the measurement signal is received with a broad bandwidth. From the measurement signal received with a broad bandwidth, information is recovered. In a second measurement run, at least one first frequency subdivision of the measurement signal is received with a narrow bandwidth with the assistance of the information recovered. In this manner, a high measurement accuracy is achieved in the measurement of the measurement signal.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The invention is described by way of example in the following with reference to the drawings in which the exemplary embodiment of the invention is illustrated in a simplified manner. The drawings show.

DETAILED DESCRIPTION

Initially, the construction of an exemplary measurement signal and the problems on which the present invention is based will be explained with reference to FIG. 1. The construction and functioning of various forms of the measuring system will then be illustrated with reference to FIGS. 2-3. Finally, the functioning of an exemplary embodiment of the method according to the invention will be described with reference to FIG. 4. The presentation and description of identical elements in similar drawings have not been repeated in some cases.

Figure 1:
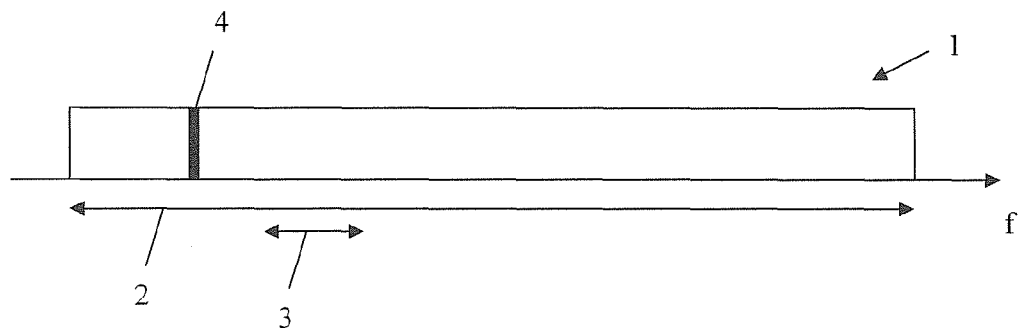
FIG. 1 an exemplary measurement signal in the frequency domain.

FIG. 1 shows an exemplary measurement signal 1 in the frequency domain. The measurement signal 1 contains a preamble 4, which, in this example, is disposed at a fixed position within the frequency range. The measurement signal 1 includes a frequency range 2. The implementation of a correct synchronisation when measuring the measurement signal 1, requires information, which can be distributed over the entire frequency range, for example, of the preamble 4. Information from a signalling may also be required here. Such information can therefore be determined only within the framework of a measurement of the entire frequency range 2 of the measurement signal 1. However, a broadband measurement of the measurement signal 1 only allows a measurement which does not achieve a sufficiently high precision for the measurement of transmitters of a comparable level of technology. The present invention is therefore based upon the general concept of initially measuring the entire measurement signal 1 with a broad bandwidth and, in this context, obtaining information allows an accurate measurement of the measurement signal 1 within a narrowband measurement, for example, only within a frequency range 3.

Figure 2:
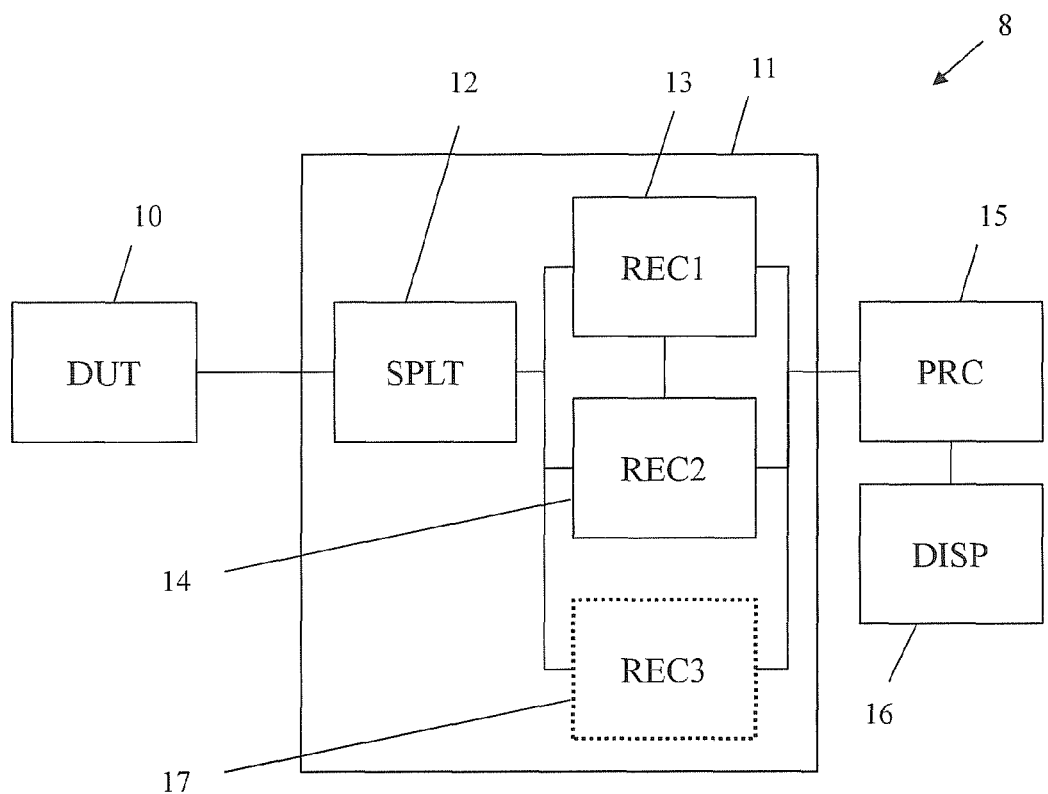
FIG. 2 a block-circuit diagram of a first exemplary embodiment of the measuring system according to the invention.

FIG. 2 shows a first exemplary embodiment of the measuring system 8 according to the invention. The measuring system 8 according to the invention contains a receiving unit 11 and a processing unit 15. Additionally, it contains a display unit 16. In this context, the receiving unit 11 is connected to a device under test 10 which generates a measurement signal. The receiving unit 11 accordingly contains a power splitter 12, which is connected to the device under test 10. An output of the power splitter 12 is connected to a first receiver 13 and a second receiver 14. The receivers 13, 14 are further connected to one another.

Furthermore, the receivers 13, 14 are connected to the processing unit 15. The first receiver 13 in this context is a broadband receiver. The second receiver 14 in this context is a narrowband receiver. The display unit 16 is connected to the processing unit 15.

Optionally, the receiving unit 11 contains a second narrowband receiver 17, which is also connected to the power splitter 12 and the processing unit 15. Furthermore, this second narrowband receiver 17 is connected to the broadband receiver 13. However, for reasons of visual clarity, this is not illustrated in FIG. 2.

When a measurement is to be implemented, the device under test 10—for example, a transmitter—is caused to transmit a measurement signal. The measurement signal is divided by the power splitter 12, and a largely identical measurement signal is supplied respectively to the first receiver 13 and to the second receiver 14. The broadband receiver 13 measures the measurement signal with a broad bandwidth and reroutes the measurement results to the processing unit 15. In this context, for example, a digitised measurement signal and/or a digitised measurement signal transferred into an intermediate frequency range is transmitted. A transmission of a measurement signal after a de-mapping or a completely decoded measurement signal is also possible here. The processing unit 15 now determines information from the measurement signal received with a broad bandwidth which is used by the narrowband receiver 14 in a second measurement run.

The narrowband receiver 14 uses the information transmitted by the processing unit 15 in order to implement, for its part, a narrowband reception of at least one first frequency subdivision of the measurement signal. As already explained, the processing unit 15 determines, for example, information about the signal structure, for example, the position of a preamble 4, and/or positions of carriers and sub-carriers within the measurement signal. On this basis, the processing unit 15 optionally specifies the frequency range 3 from FIG. 1, which is used by the narrowband receiver 14 in order to measure the measurement signal.

The broadband and narrowband measurement of the measurement signal 1 can therefore take place in succession. However, with given signals, a measurement by the narrowband receiver 14 is also possible before results from the measurement of the broadband receiver 13 are present. In this case, the information derived from the broadband reception is used only as soon as it is available.

In the case of a typical measurement, for example, with a DOCSIS 3.1 signal, the broadband receiver 13 is initially adjusted and synchronised to the measurement signal 1. Following this, the position of the preamble 4 is detected by means of the processing unit 15. The narrowband receiver can now also be adjusted to the frequency position of the preamble 4. Via a correlation with the preamble, both receivers now locate its time position. In this manner, the delay-time differences of the different reception paths of the broadband receiver 13 and of the narrowband receiver 14 can be compensated by means of delay elements. In this context, the delay elements can either be realised discretely in hardware as a part of the broadband receiver 13 and narrowband receiver 14 or can be realised in software in the post-processing by the processing unit 15.

Within the synchronisation of the broadband receiver 13 with the measurement signal 1, a reception-frequency adjustment and a sampling-rate adjustment are typically implemented. The broadband receiver 13 communicates this information to the narrowband receiver 14. For its measurement, the narrowband receiver 14 is accordingly adjusted to the start values of the reception frequency and sampling rate of the broadband receiver 13.

With the assistance of continual pilot symbols (continual pilots), which occur in the frequency subdivision received by the narrowband receiver 14, the latter can additionally be compensated phase differences between the two reception paths. The broadband receiver 13 therefore receives the same continual pilots, thereby allowing a balancing between the broadband receiver 13 and the narrowband receiver 14.

With the assistance of scattered pilot symbols (scattered pilots), which are available periodically on every carrier of the measurement signal, both receivers 13, 14 can each implement their own channel estimation in order to compensate frequency-response differences of the two receivers.

With the assistance of the broadband receiver 13, which, by contrast with the narrowband receiver 14, is capable of implementing a de-mapping of the measurement signal 1, it can preferably be determined which sub-carrier of each OFDM symbol provides which modulation order. This information is transmitted to the narrowband receiver 14, so that the latter is now also capable of decoding the measurement signal 1 and determining an average error rate and/or a signal-noise ratio and/or other parameters of the measurement signal 1.

In this context, the frequency subdivision 3 can be shifted stepwise along the entire measurement signal 1, so that the precise measurement values of the narrowband receiver 14 become gradually available for the entire measurement signal 1. If the second narrowband receiver 17 is used at the same time as the first narrowband receiver 14, the measurement rate in the case of a subdivision of the measurement signal 1 between the two narrowband receivers 14, 17 can be increased accordingly. With a simultaneous measurement of an identical frequency subdivision, an increase in measurement accuracy can be achieved by averaging the measurement results.

Figure 3:
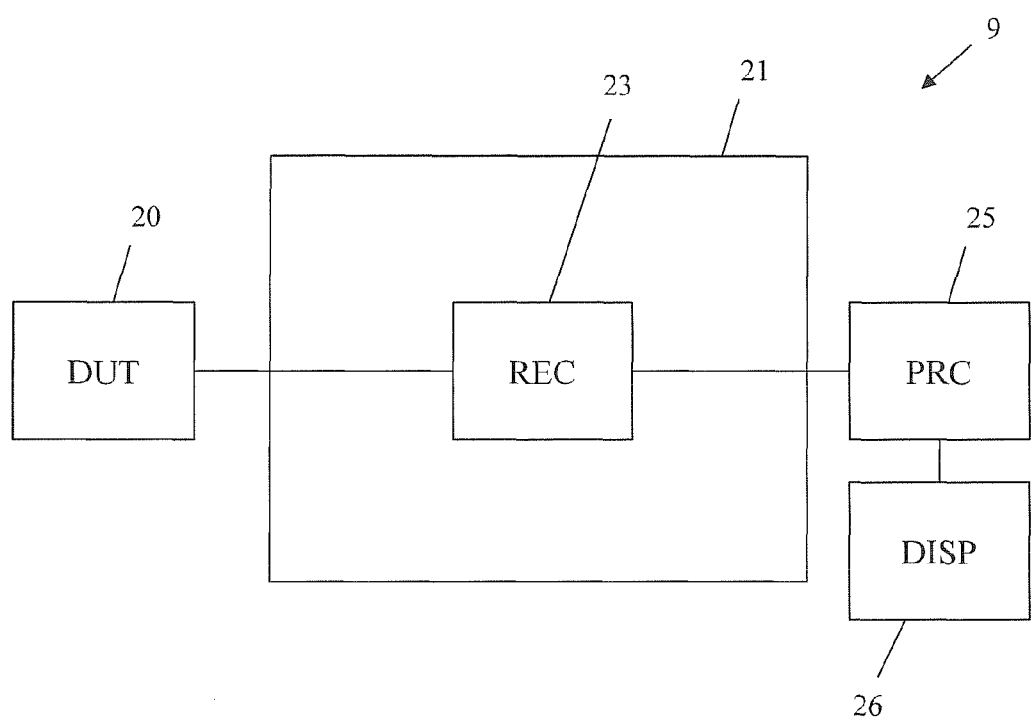
FIG. 3 a block-circuit diagram of a second exemplary embodiment of the measuring system according to the invention.

FIG. 3 shows a second exemplary embodiment of the measuring system 9 according to the invention. This measuring system 9 contains a receiving unit 21, a processing unit 25 and a display unit 26. The measuring system 9 differs from the measuring system 8 in FIG. 2 to the extent that the receiving unit 21 contains only a single receiver 23, which is connected directly to the device under test 20 and to the processing unit 25. The receiver 23 is accordingly adjustable in its reception-frequency range. That is, in a first measurement run, the receiver 23 measures the measurement signal with a broad bandwidth. On the basis of the results of this broadband measurement, the processing unit 25 determines information which is used by the receiver 23 within a subsequent narrowband measurement in a second measurement run.

Figure 4:
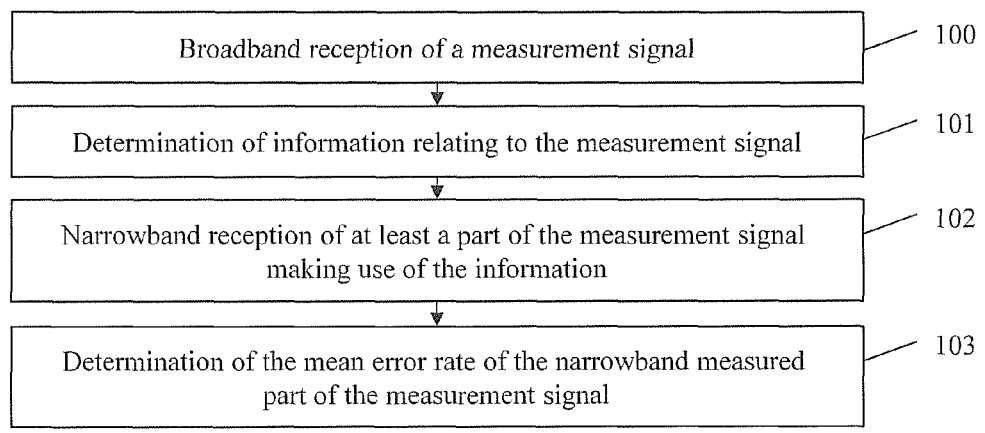
FIG. 4 an exemplary embodiment of the measurement method according to the invention.

FIG. 4 shows an exemplary embodiment of the measuring method according to the invention. In a first step 100, a broadband reception of a measurement signal is implemented. In a second step 101, information relating to the measurement signal is determined on the basis of the broadband reception. In a third step 102, a narrowband reception of at least one part of the measurement signal is implemented with the use of the information relating to the measurement signal determined on the basis of the broadband reception. In a fourth step 103, a mean error rate and/or other parameters of the narrowband measured part of the measurement signal are determined.

In this context, the narrowband reception need not begin until after the full completion of the broadband reception. The narrowband reception can begin as early as the beginning of the broadband reception. Only after the information determined on the basis of the results of the broadband reception has been provided, can it be used for the narrowband reception.

With regard to the details of the individual steps 100-103, reference is additionally made to the deliberations regarding the exemplary embodiments of the measuring system according to the invention shown in FIGS. 1-3.

The invention is not restricted to the exemplary embodiment presented. In particular, it is not restricted to OFDM signals in general or to the DOCSIS 3.1 signal in particular. Furthermore, an arbitrary number of narrowband receivers can be used. In particular, it is conceivable to use such a large number of narrowband receivers that the entire measurement signal can be measured simultaneously with a narrow bandwidth, while each narrowband receiver measures only one signal subdivision.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

The invention claimed is:

1. A measuring system for measuring a broadband measurement signal, the measuring system comprising:
   a receiving circuit configured to receive the measurement signal; and
   a processing circuit configured to process the received measurement signal, wherein:
   the receiving circuit is configured to receive the measurement signal with a broad bandwidth within a first measurement run,
   the processing circuit is configured to recover information from the measurement signal received with a broad bandwidth,
   the receiving circuit is configured to receive at least one first frequency subdivision of the measurement signal with the assistance of the information with a narrow bandwidth within a second measurement run,
   wherein the processing circuit is configured to detect reception values of scattered pilots of the measurement signal within the information,
   the processing circuit is configured to implement a channel estimation on the basis of the reception values of the scattered pilots and, in this manner, to determine a frequency response of the broadband reception,
   the processing circuit and the receiving circuit are configured to:
      detect reception values of scattered pilots in the first frequency subdivision of the measurement signal within the second measurement run, and
      implement a channel estimation on the basis of the reception values of the scattered pilots and, in this manner, to determine a frequency response of the narrowband reception.

2. The measuring system according to claim 1, wherein the receiving circuit is configured to receive a plurality of frequency subdivisions of the measurement signal in succession with a narrow bandwidth within the second measurement run.

3. The measuring system according to claim 2, wherein the receiving circuit is configured to receive all of the frequency subdivisions of the measurement signal in succession with a narrow bandwidth within the second measurement run.

4. The measuring system according to claim 2, wherein:
   the receiving circuit comprises one receiver,
   a reception-frequency range of the receiver is adjustable,
   the receiver is configured to:
      implement the first measurement run with a reception-frequency range adjusted with a broad bandwidth to the entire measurement signal, and
      implement the second measurement run with a reception-frequency range adjusted with a narrow bandwidth to at least the first frequency subdivision of the measurement signal.

5. The measuring system according to claim 1, wherein:
the receiving circuit comprises a broadband receiver and at least one first narrowband receiver,
that the broadband receiver is configured to implement the first measurement run,
that the first narrowband receiver is configured to implement at least one first part of the second measurement run, and
the first part of the second measurement run includes a reception of the first frequency subdivision.

6. The measuring system according to claim 5, wherein:
the receiving circuit comprises a second narrowband receiver, the second narrowband receiver is configured to implement at least one second part of the second measurement run,
the second part of the second measurement run includes a reception of at least one second frequency subdivision of the measurement signal.

7. The measuring system according to claim 6, wherein the first narrowband receiver and the second narrowband receiver are configured to implement the first part of the second measurement run and the second part of the second measurement run at the same time.

8. The measuring system according to claim 1, wherein:
the receiving circuit is configured to implement a synchronization with the measurement signal as a part of the first measurement run,
the receiving circuit is configured to implement an adjustment of a reception frequency and a reception sampling rate within the synchronization, and
the processing circuit is configured to use the reception frequency and reception sampling rate of the adjustment of the receiving circuit as information within the information recovery.

9. The measuring system according to claim 1, wherein:
the processing circuit is configured to detect a signal structure of the measurement signal within the information recovery,
the processing circuit is configured to determine a position of the first frequency subdivision on the basis of the signal structure, and/or
the processing circuit and the receiving circuit are configured to determine and to compensate delay-time differences between the broadband reception and the narrowband reception on the basis of the signal structure.

10. The measuring system according to claim 1, wherein:
the processing circuit is configured to detect positions of continual pilots in the first frequency subdivision of the measurement signal within the information recovery,
the processing circuit and the receiving circuit are configured to:
detect positions of continual pilots within the first frequency portion of the measurement signal within the second measurement run, and
derive and to compensate phase differences of the broadband reception and of the narrowband reception from the positions of the continual pilots in the first frequency subdivision.

11. A measuring system for measuring a broadband measurement signal, the measuring system comprising:
a receiving circuit configured to receive the measurement signal: and
a processing circuit configured to process the received measurement signal, wherein:

the receiving circuit is configured to receive the measurement signal with a broad bandwidth within a first measurement run,
the processing circuit is configured to recover information from the measurement signal received with a broad bandwidth,
the receiving circuit is configured to receive at least one first frequency subdivision of the measurement signal with the assistance of the information with a narrow bandwidth within a second measurement run,
wherein the processing circuit is configured to detect reception values of scattered pilots of the measurement signal within the information,
the processing circuit is configured to implement a channel estimation on the basis of the reception values of the scattered pilots and, in this manner, to determine a frequency response of the broadband reception,
the processing circuit is configured to determine modulation orders of different subdivisions of the measurement signal within the information,
the processing circuit is configured to determine one or more modulation orders of the first frequency subdivision on the basis of the modulation orders of the different subdivisions of the measurement signal,
the receiving circuit is configured to implement a de-mapping of symbols of the first frequency subdivision of the measurement signal received with a narrow bandwidth on the basis of the one or more modulation orders of the first frequency subdivision, and
the processing circuit is configured to determine a modulation error ratio (MER) and/or a signal-noise ratio (SNR) and/or an error-vector magnitude (EVM) of the measurement signal on the basis of the decoded symbols of the first frequency subdivision.

12. A method for measuring a broadband measurement signal, the method comprising:
receiving and processing the measurement signal, wherein:
the measurement signal is received with a broad bandwidth within a first measurement run,
information is recovered from the measurement signal received with a broad bandwidth,
with the assistance of the information, at least one first frequency subdivision of the measurement signal is received with a narrow bandwidth within a second measurement run,
reception values of scattered pilots of the measurement signal are detected within the information,
a channel estimation is implemented on the basis of the reception values of the scattered pilots and, in this manner, a frequency response of the broadband reception is determined,
reception values of scattered pilots in the first frequency subdivision of the measurement signal are detected within the second measurement run, and
a channel estimation is implemented on the basis of the reception values of the scattered pilots in the first frequency subdivision and, in this manner, a frequency response of the narrowband reception is determined.

13. The method according to claim 12, wherein a plurality of the frequency subdivisions of the measurement signal is received in succession with a narrow bandwidth within the second measurement run.

14. The method according to claim 13, wherein all of the frequency subdivisions of the measurement signal are received in succession with a narrow bandwidth within the second measurement run.

15. The method according to claim 12, wherein the first measurement run and the second measurement run are implemented at the same time or in succession.

16. The method according to claim 12, wherein:
a synchronization with the measurement signal is implemented as a part of the first measurement run,
that an adjustment of a reception frequency and of a reception sampling rate is implemented within the synchronization, and
that the reception frequency and reception sampling rate of the adjustment of the receiving unit are used as information within the information recovery.

17. The method according to 12, wherein:
a signal structure of the measurement signal is detected within the information recovery, and a content of the preamble is read out,
a position of the first frequency subdivision is determined on the basis of the signal structure, and/or
delay-time differences between the broadband reception and the narrowband reception are determined and compensated on the basis of the signal structure.

18. The method according to claim 12, wherein:
positions of continual pilots in the first frequency subdivision of the measurement signal are detected within the information recovery, and
within the second measurement run:
positions of continual pilots in the first frequency subdivision of the measurement signal are detected, and
phase differences of the broadband reception and of the narrowband reception are derived from the positions of the continual pilots in the first frequency subdivision and compensated.

19. A method for measuring a broadband measurement signal, the method comprising:
receiving and processing the measurement signal, wherein:
the measurement signal is received with a broad bandwidth within a first measurement run,
information is recovered from the measurement signal received with a broad bandwidth,
with the assistance of the information, at least one first frequency subdivision of the measurement signal is received with a narrow bandwidth within a second measurement run,
reception values of scattered pilots of the measurement signal are detected within the information,
a channel estimation is implemented on the basis of the reception values of the scattered pilots and, in this manner, a frequency response of the broadband reception is determined,
modulation orders of different subdivisions of the measurement signal are determined within the information,
one or more modulation orders of the first frequency subdivision are determined on the basis of the modulation orders of the different subdivisions of the measurement signal,
a de-mapping of symbols of the first frequency subdivision of the measurement signal received with a narrow bandwidth is implemented on the basis of the one or more modulation orders of the first frequency subdivision, and
that a modulation error ratio (MER) and/or a signal-noise ratio (SNR) and/or an error-vector magnitude (EVM) of the measurement signal are determined on the basis of the decoded symbols of the first frequency subdivision.

* * * * *